(12) United States Patent
Dreyer et al.

(10) Patent No.: US 7,477,157 B2
(45) Date of Patent: Jan. 13, 2009

(54) APPARATUS FOR DETERMINING AND/OR MONITORING A PROCESS VARIABLE OF A MEDIUM

(75) Inventors: Volker Dreyer, Lorrach (DE); Chris Rompf, Greenwood, IN (US); Alexander Muller, Sasbach-Jechtingen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 417 days.

(21) Appl. No.: 11/250,571

(22) Filed: Oct. 17, 2005

(65) Prior Publication Data

US 2006/0114111 A1 Jun. 1, 2006

Related U.S. Application Data

(60) Provisional application No. 60/621,672, filed on Oct. 26, 2004.

(30) Foreign Application Priority Data

Oct. 15, 2004 (DE) .................. 10 2004 050 496

(51) Int. Cl.
*G08B 21/00* (2006.01)

(52) U.S. Cl. ............... 340/612; 340/616; 340/531; 340/534; 375/265; 375/268

(58) Field of Classification Search ............ 340/538.11, 340/310.12, 572.1, 612, 616, 534, 536, 638, 340/537; 341/110; 327/100–104; 375/265, 375/268, 300, 286, 288, 292; 714/47, 701, 714/709
See application file for complete search history.

(56) References Cited

U.S. PATENT DOCUMENTS

| | | | | |
|---|---|---|---|---|
| 4,090,172 | A * | 5/1978 | Vesnic | 340/448 |
| 5,801,305 | A * | 9/1998 | Kawai et al. | 73/146.2 |
| 5,895,848 | A | 4/1999 | Wilson | |
| 2001/0026564 | A1* | 10/2001 | Bastiaansen et al. | 372/29.01 |
| 2005/0052283 | A1* | 3/2005 | Collins et al. | 340/572.7 |

* cited by examiner

*Primary Examiner*—George A Bugg
*Assistant Examiner*—Hoi C Lau
(74) *Attorney, Agent, or Firm*—Bacon & Thomas, PLLC

(57) ABSTRACT

An apparatus for determining and/or monitoring a physical or chemical process variable of a medium, having a sensor unit, which produces a measurement signal with a piece of process variable-dependent, basic information, and having an evaluation unit which, from the measurement signal of the sensor unit, determines a measured value for the process variable, and which produces an output signal with information concerning whether the measured value is greater or smaller than a limit value. A first and second modulation range are provided, and the evaluation unit modulates the output signal within the first or second modulation range with the basic information of the measurement signal, with the evaluation unit modulating the output signal within the first modulation range when the process variable is smaller than the limit value, and with the evaluation unit modulating the output signal within the second modulation range when the process variable is greater than the limit value.

5 Claims, 2 Drawing Sheets

APPARATUS FOR DETERMINING AND/OR MONITORING A PROCESS VARIABLE OF A MEDIUM

FIELD OF THE INVENTION

The invention relates to an apparatus for determining and/or monitoring at least one physical or chemical process variable of a medium in a container.

BACKGROUND OF THE INVENTION

Limit level switches are manufactured and sold by Endress+Hauser. These involve, for example, so-called oscillation forks, which are excited to oscillate at their resonance frequency. If these sensors interact with the medium, then the frequency and also the amplitude of the oscillations change. In the case of bulk goods, the amplitude is most often considered, while, in the case of liquids, the frequency is more likely to be evaluated. If the fork oscillates freely, then the oscillation frequency is higher than in the condition where the medium covers the fork. Thus, it can be inferred from a reduction of the resonance frequency that a covering of the fork by the medium has occurred, and consequently, that a fill level has been reached by the medium. The contrary applies to the case where a fill level is subceeded, or fallen beneath. Depending on the case, an appropriate switching signal is issued. The limit value itself is dependent on, among other things, the dimensioning of the sensor unit and its installation position.

An output signal is normally produced by such a measuring arrangement, which signal carries the information concerning whether the fill level has been subceeded or exceeded. Thus, from the measurement signal, which carries information concerning the amplitude and the resonance frequency of the sensor, a single piece of information is distilled; that is, it amounts to an information reduction, but with such there is also an information loss. This output signal, indeed, does permit the control of actuators such as pumps, valves, etc., but information, such as e.g. the gradual change of resonance frequency with the amount of covering, can no longer be exploited.

SUMMARY OF THE INVENTION

It is thus an object of the invention to provide a measuring apparatus which both supplies a distinct switching signal with respect to the measured process variable, and also delivers at least one additional piece of information concerning the measurement itself.

This object is achieved by the invention in that at least a first and a second modulation range are specified within the signal range, and that the evaluation unit is formed such that it modulates the output signal within the first or second modulation range at least with the basic information of the measurement signal, with the evaluation unit modulating the output signal within the first modulation range when the process variable is smaller than the limit value, and with the evaluation unit modulating the output signal within the second modulation range when the process variable is greater than the limit value.

The measuring device of the invention obtains the value of the process variable from the measurement signal. The measured value is checked whether it is larger or smaller than at least one predeterminable limit value. In the simplest case, only one limit value is provided. Based on this comparison, the evaluation unit issues an output signal, which carries at least the information concerning whether the limit value has been exceeded or subceeded. For practical purposes, the measuring device is, thus, a limit level switch. If, for example, it is a fill level measuring device, then the output signal gives information concerning whether a predetermined fill level, which is determined by the shape of the sensor unit and the installation position of sensor, has been subceeded or exceeded. With this information, pumps or valves can then be controlled. To differentiate the two conditions, the output signal lies within either the first or the second modulation range. If the signal range includes an electrical current range of the output signal, then the modulation ranges are two separate current ranges. Furthermore, the modulation ranges are as free from overlap as possible, that is, they are two modulation ranges, separated from one another.

The measurement signal itself normally carries the basic information concerning a physical variable, which is dependent on the process variable, which, in addition, is detected by the sensor unit, and lastly which allows the conclusion to be drawn about the process variable. In general, the term "modulation" means the impressing of information onto a signal. Thus, the term "modulation" also means the coding of the output signal with the additional information. Since the modulation also occurs within a modulation range—the term "coding range" is thus also possible—this means that the output signal lies within this modulation range. If the sensor unit is, for example, a limit level switch including a mechanically oscillatable unit, as described above, then, in such case, the frequency, amplitude, or phase of the oscillations relative to the excitation signal is measured. In the case of such a measuring device, the interaction of the oscillatable unit with the medium is exploited, in order to measure the fill level. The physical variable, thus the basic information in this example, is the frequency, on the basis of which the process variable, fill level, is determined, thus quasi-derived from the basic information.

Thus, the invention is, that the output signal is modulated with at least the basic information, with the modulation occurring in at least one of two modulation ranges (if multiple limit values are provided, then correspondingly many modulation ranges are to be defined). Thus, the output signal carries the basic information. The modulation ranges further permit that the derived information concerning the process variable can also be delivered (by the modulation or especially by an appropriate coding). If the measuring device is the above-mentioned limit level switch, then delivered with the output signal is, for example, the frequency as basic information, and the exceeding or subceeding as derived information. From the specific modulation range, within which the modulation takes place, or within which the output signal lies, follows the conclusion concerning the fill level relative to the predetermined limit value. From the modulation or the coding of the output signal (e.g. via a direct frequency modulation, or e.g. via a defined correlation/coding between a change in frequency and an electrical current level of the output signal, the latter being a kind of coding) within this modulation range, follows the conclusion concerning the resonance frequency of the oscillations of the mechanically oscillatable unit.

The advantage of the two separate modulation ranges results from the certainty that the conclusion concerning the process variable (=switching signal) is delivered unequivocally, since the output signal can lie specifically only in the particular one of the two modulation ranges. In other words: the switching signal is formed such that the ranges for the two states (e.g. covered sensor or free sensor) are clearly and definitely distinguishable, and that the evaluation of further information is independent thereof.

An embodiment includes that the two modulation ranges are preset during the fabrication of the apparatus as a part of the manufacture. It is thus defined by the manufacturer, which ranges are assigned to which information. Consequently, in the case of the process variable, fill level, dependencies of the switching point on e.g. viscosity or density can be preset in the measuring device, and it is not possible for misadjustments to be made on part of the user.

An embodiment includes that the output signal lies within the first modulation range when the process variable is smaller than the predetermined limit value, and in which the output signal lies within the second modulation range when the process variable is greater than the predetermined limit value. Then the position of the output signal within the signal range tells immediately, because of this separation, how the process variable lies relative to the limit value.

An embodiment provides that a separation range lies between the two modulation ranges. Such a separation range between the first and second modulation range (in the case of more limit values, more modulation ranges, and thus more separation ranges are also necessary) is, for example, a signal range, in which the output signal cannot, and must not, appear. Consequently, such a separation range permits a stricter separation between the modulation ranges, and also the recognition of the existence of an error. Using this embodiment, any overlap between the modulation ranges, and thus an ambiguity of the basic conclusion (e.g. sensor is free or covered), is prevented.

An embodiment provides that the output signal is an electrical current signal. Depending on the protocol used, the switching states (subceeding or exceeding) can be signalized with the current level at the output of the measuring device.

An embodiment includes that the signal range of the output signal lies between 4 mA and 20 mA. This is a special embodiment that is common in the field of automation technology.

An embodiment provides that the measurement signal is an electrical signal which carries a resonance frequency of the sensor unit. In the case of the limit level switch with a mechanically oscillatable unit discussed above, the oscillations of the oscillatable unit are transferred into an alternating voltage whose frequency corresponds to the resonance frequency of the mechanically oscillatable unit. From this basic information, frequency, the information concerning the fill level can then be obtained.

An embodiment includes that the evaluation unit is formed such that it modulates the output signal with the resonance frequency, or with a change of the resonance frequency of the output signal. This embodiment is connected to that above, in that the basic information, from which the fill level is derived, is used for modulating the output signal. If the output signal were to be modulated only with the frequency, without the modulation ranges, then the correlation between the switching point and frequency would no longer be assured. This correlation is permanently stored in the evaluation unit of the apparatus of the invention, so that, from this side, the appropriate switching signal is given at the proper fill level. In the case that a signal is only modulated, responsibility for distinguishing between the conditions would be shifted to the outside, which can involve risks. The output signal can thus directly carry information about the absolute value of the resonance frequency (e.g. using an appropriate frequency modulation), or the change of the resonance frequency relative to a predetermined frequency (e.g. the resonance frequency in the case of an uncovered, and thus freely oscillating, oscillatable unit) is delivered. The former is a modulation of the signal in the classical sense, the latter is a kind of coding.

An embodiment includes that the sensor unit has at least one mechanically oscillatable unit, whose resonance frequency depends at least on the amount of covering of the mechanically oscillatable unit by the medium. In this case, it is thus a measuring device from the field of vibrancies. The basic information here, for example, is the frequency or the amplitude of the oscillations.

An embodiment provides that the evaluation unit is formed such that it monitors the subceeding or exceeding of a predetermined fill level, and such that the first modulation range displays the subceeding of the fill level, and the second modulation range displays the exceeding of the fill level.

BRIEF DESCRIPTION OF THE DRAWINGS

The invention will now be described in greater detail on the basis of the drawings, the figures of which show as follows.

DESCRIPTION OF THE PREFERRED EMBODIMENT

The apparatus includes at least one sensor unit which produces a measurement signal having at least one piece of process variable-dependent, basic information. The apparatus additionally includes at least one evaluation unit which determines, from the measurement signal of the sensor unit, a measured value for the process variable, and which produces at least one output signal, with the output signal carrying at least one piece of information concerning whether the measured value is larger or smaller than at least one predeterminable limit value, and with the output signal lying within a predeterminable signal range. The process variable can be, for example, the fill level, density, viscosity, temperature, pressure, flow rate, conductivity, or pH-value of a medium. The medium can be, for example, a liquid, or bulk goods. A common name for such apparatuses is also "switch."

Figure 1:
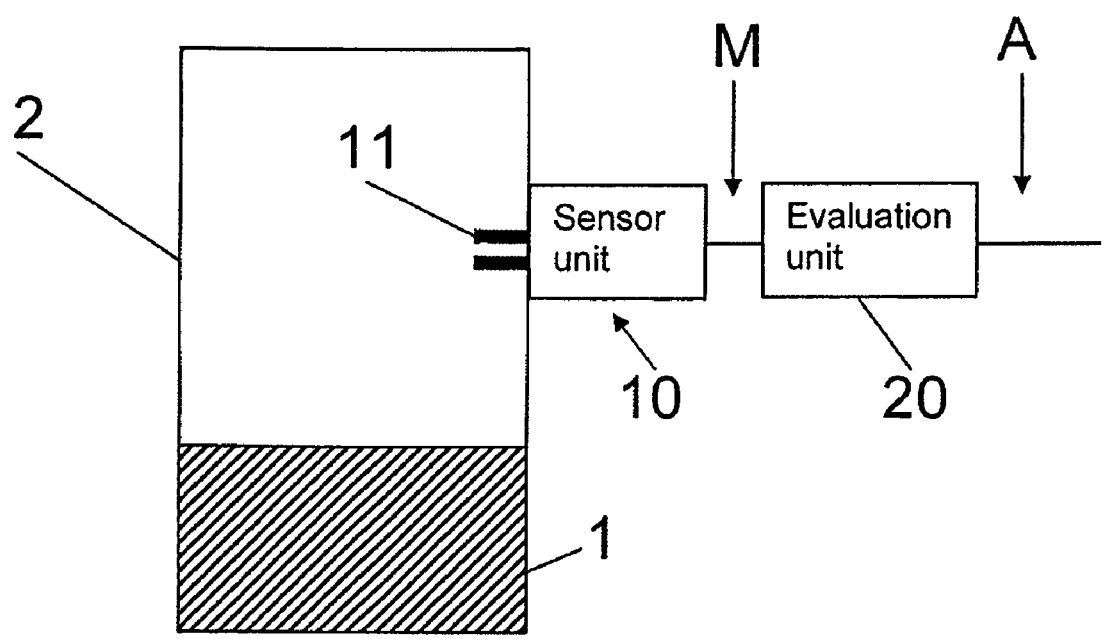
FIG. 1 a schematic illustration of a measuring device of the invention.

In FIG. 1, the sensor unit 10 of the measuring apparatus of the invention has a mechanically oscillatable unit 11 in the form of an oscillation fork with two tines. This oscillatable unit 11 is, for example, excited to mechanical oscillations by a piezoelectric unit (not shown), via a diaphragm, on which unit 11 is mounted. Conversely, the mechanical oscillations can be detected by such a piezoelectric unit, such that they are converted into an electric, alternating current. The frequency and the amplitude, but also the phase of the detected signals relative the excitation signal, permit determination of the fill level. Thus, for example, the frequency is lower when the mechanically oscillatable unit 11 is covered by the medium 1. However, there are also other dependencies, such as on the density or the viscosity of the medium 1.

The sensor unit 10 produces the actual measurement signal M, which here is the aforesaid electric, alternating voltage. The measurement signal M is transmitted to the evaluation unit 20. In this particular case, in the evaluation unit 20, a feedback unit—not shown—is provided, which amplifies the measurement signal, and feeds it back to the sensor unit 10. Thus, for the evaluation unit 20, the term "control/evaluation unit" is also common. The evaluation unit 20 produces an output signal A, which, according to the state of the art, transmits the switching condition. It is normally distinguished between the exceeding and the subceeding of a fill level, with the designations max- or overfill protection, respectively, min- or run-empty protection also being used. In the state of the art, the measurement signal M is thus reduced to one statement concerning the fill level.

The frequency of the oscillations changes gradually with the amount of covering, so that normally a limit value is given, after which the evaluation unit 20 issues the appropriate switching signal in the output signal A. From information which would allow for the specification of intermediate levels, a strict distinction is thus made between two ranges: subceeding or exceeding. According to the invention, the output signal A is modulated with the basic information in the form of the frequency of the measurement signal M. In doing so, however, the range, within which the output signal is modulated, depends on whether the limit value, in terms of fill level, has been subceeded or exceeded. Thus, from the modulation of the output signal A, the basic information—here the frequency of the oscillations—and, from the modulation range, the switching condition, can be obtained. There are, thus, two pieces of information which are, at the same time, still distinguished from one another, and which, consequently, do not interact with one another.

Figure 2:
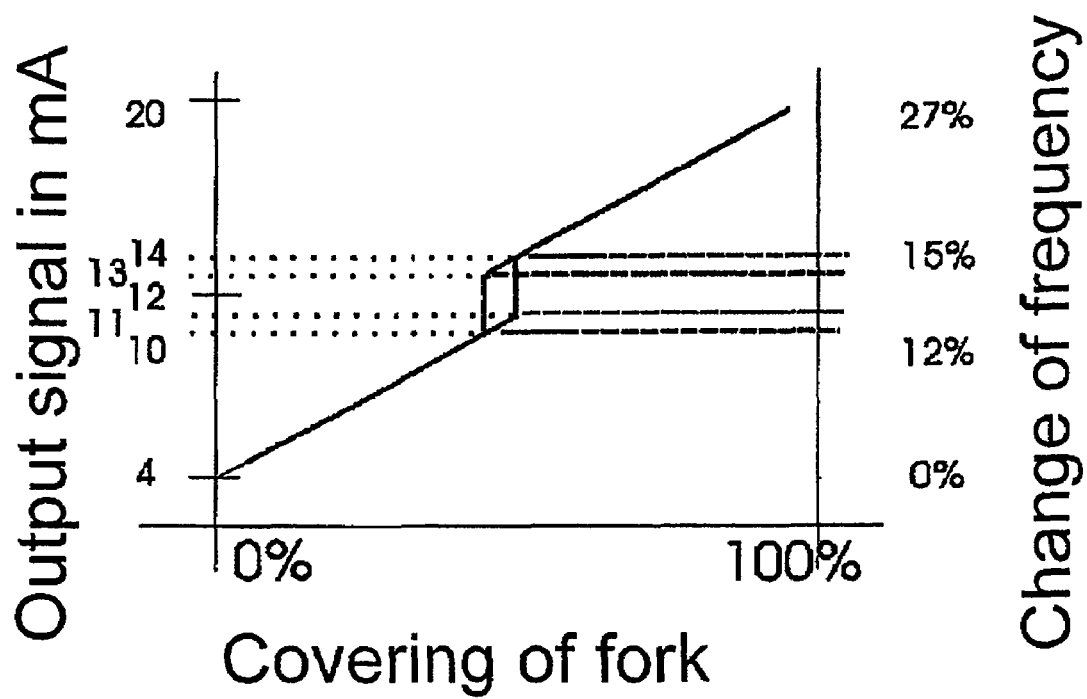
FIG. 2 a schematic illustration of the character of the output signal.

In FIG. 2, the schematic character of an output signal A of the apparatus in FIG. 1 is illustrated by way of example. Here, it is a 4 to 20 mA signal, i.e. the output signal is an electrical current signal which can lie between 4 mA and 20 mA. The signal range of the output signal A is thus 4 mA to 20 mA. In this example, the two modulation ranges, 4 mA to 10 mA and 14 mA to 20 mA, are provided with a separation range between them. The following information is connected therewith: If the output signal A lies below 10 mA, then the switching point, or the fill level associated with it, has not yet been reached. If the output signal A lies above 14 mA, then the fill level has been exceeded. This is the direct information concerning the switching condition.

However, within these modulation ranges, the current level informs of the resonance frequency of the mechanically oscillatable unit, or the change of its frequency, depending on which of the two ways of presenting the information has been selected. Each modulation range possesses a breadth of 6 mA. The switching point here lies at a fill level at which the medium generates a frequency change between 12% and 15% relative to the resonance frequency of the oscillations in the uncovered condition. For this reason, a covering of the mechanically oscillatable unit up to this threshold thus leads only to a change of less than 12%, or, as the case may be, above this threshold a change greater than 15% results. In order to indicate these gradual changes, the output signal A is modulated such that a frequency change of 2%, relative to the fundamental frequency, is connected with an increase in current of 1 mA. For the lower modulation range, this means that 4 mA is associated with a frequency change of 0%, and 10 mA with 12%. Note that there is here, in effect, a coding of information. Thus from the current level of the output signal A within the respective modulation range, the frequency change, as a percentage, can be calculated.

The invention claimed is:

1. An apparatus for determining and/or monitoring at least one physical or chemical variable of a medium in a container, having:
   at least one sensor unit, which produces a measurement signal with at least one piece of process-variable-dependent, basic information; and
   at least one evaluation unit, which, from the measurement signal of said sensor unit, determines a measured value for the process variable, and which produces at least one output signal, wherein:
   said output signal carries at least one piece of information concerning whether the measured value is greater or smaller than at least one predeterminable limit value;
   said output signal lies within a predeterminable signal range;
   at least one first and one second modulation range within the signal range are provided;
   said evaluation unit is formed such that it modulates said output signal within the first or second modulation range, at least with the basic information of said measurement signal;
   said evaluation unit modulates said output signal within the first modulation range when the process variable is smaller than the limit value;
   said evaluation unit modulates said output signal within the second modulation range when the process variable is greater than the limit value;
   said output signal lies within the first modulation range when the process variable is smaller than the predetermined limit value;
   said output signal lies within the second modulation range when the process variable is greater than the predetermined limit value;
   a separation range lies between the two modulation ranges;
   said measurement signal is an electrical signal which carries a resonance frequency of said sensor unit;
   said evaluation unit is formed such that it modulates said output signal with the resonance frequency, or with a change of the resonance frequency, of said measurement signal; and
   said sensor unit comprises at least one mechanically oscillatable unit, whose resonance frequency depends at least on the amount of covering of said mechanically oscillatable unit by the medium.

2. The apparatus as claimed in claim 1, wherein:
said two modulation ranges are preset during the fabrication of the apparatus as a part of the manufacture.

3. The apparatus as claimed in claim 1, wherein:
said output signal is an electrical current signal.

4. The apparatus as claimed in claim 3, wherein:
said signal range of said output signal lies between 4 mA and 20 mA.

5. The apparatus as claimed in claim 1, wherein:
said evaluation unit is formed such that it monitors the succeeding or exceeding of a predetermined fill level; and
the first modulation range reports the succeeding, and the second modulation range reports the exceeding, of the fill level.

* * * * *